US012640072B2

(12) United States Patent
Yang et al.

(10) Patent No.: US 12,640,072 B2
(45) Date of Patent: May 26, 2026

(54) ELECTRONIC DEVICE

(71) Applicant: InnoLux Corporation, Miao-Li County (TW)

(72) Inventors: Jen-I Yang, Miao-Li County (TW); Kuo-Jung Wu, Miao-Li County (TW); Po-Yang Chen, Miao-Li County (TW); I-An Yao, Miao-Li County (TW)

(73) Assignee: INNOLUX CORPORATION, Chu-Nan (TW)

(*) Notice: Subject to any disclaimer, the term of this patent is extended or adjusted under 35 U.S.C. 154(b) by 0 days.

(21) Appl. No.: 18/632,613

(22) Filed: Apr. 11, 2024

(65) Prior Publication Data

US 2024/0379038 A1 Nov. 14, 2024

Related U.S. Application Data

(60) Provisional application No. 63/501,258, filed on May 10, 2023.

(30) Foreign Application Priority Data

Jan. 12, 2024 (CN) ........................ 202410046413.7

(51) Int. Cl.

| | |
|---|---|
| ***G09G 3/20*** | (2006.01) |
| ***G09G 3/3208*** | (2016.01) |
| ***G09G 3/34*** | (2006.01) |
| ***G09G 3/36*** | (2006.01) |
| *G09G 3/32* | (2016.01) |

(52) U.S. Cl.

CPC ......... *G09G 3/2007* (2013.01); *G09G 3/2096* (2013.01); *G09G 3/3208* (2013.01); *G09G 3/3413* (2013.01); *G09G 3/344* (2013.01); *G09G 3/3629* (2013.01); *G09G 3/32* (2013.01); *G09G 2320/0626* (2013.01); *G09G 2320/0673* (2013.01); *G09G 2360/144* (2013.01)

(58) Field of Classification Search

CPC ...... G09G 3/34; G09G 3/2096; G09G 3/3208; G09G 3/3413; G09G 3/344; G09G 3/3629; G09G 3/32; G09G 2320/0626; G09G 2320/0673; G09G 2360/144; G06F 21/32

See application file for complete search history.

(56) References Cited

U.S. PATENT DOCUMENTS

2014/0146090 A1* 5/2014 Oh .......................... G09G 3/20 345/690
2014/0300838 A1* 10/2014 Wang ..................... G02B 30/31 359/256

(Continued)

*Primary Examiner* — Michael A Faragalla
(74) *Attorney, Agent, or Firm* — MUNCY, GEISSLER, OLDS & LOWE, P.C.

(57) ABSTRACT

A display device includes a display panel, an optical structure layer, a driving unit, a timing control unit and a light sensing unit. The optical structure layer is disposed on the display panel. The driving unit is electrically connected to the display panel. The timing control unit is electrically connected to the driving unit. The light sensing unit is electrically connected to the timing control unit to provide a light sensing result to the timing control unit. The timing control unit is used to receive a first signal and provides a second signal and a third signal to the driving unit according to the light sensing result, and the driving unit drives the display panel according to the second signal and the third signal.

17 Claims, 9 Drawing Sheets

(56) References Cited

U.S. PATENT DOCUMENTS

| | | | | |
|---|---|---|---|---|
| 2015/0070406 | A1* | 3/2015 | Baek | G09G 3/3406 345/88 |
| 2019/0004213 | A1* | 1/2019 | Tung | G02B 5/0221 |
| 2019/0057660 | A1* | 2/2019 | Lee | G06F 1/1637 |
| 2020/0150317 | A1* | 5/2020 | Huckaby | G02B 5/0221 |
| 2021/0043691 | A1* | 2/2021 | Yoon | H10K 50/865 |
| 2022/0026614 | A1* | 1/2022 | Kim | G02B 1/04 |
| 2022/0358887 | A1* | 11/2022 | Liao | G09G 3/3413 |
| 2022/0373837 | A1* | 11/2022 | Zhang | G02F 1/133553 |
| 2023/0200181 | A1* | 6/2023 | Park | H10K 59/40 345/173 |

* cited by examiner

ELECTRONIC DEVICE

CROSS-REFERENCE TO RELATED APPLICATIONS

This application claims the benefit of filing date of U.S. Provisional Application Ser. No. 63/501,258 filed on May 10, 2023 under 35 USC § 119(e)(1), and also claims the benefit of the Chinese Patent Application Serial Number 202410046413.7, filed on Jan. 12, 2024, the subject matters of which are incorporated herein by reference.

BACKGROUND

Field of the Disclosure

The present disclosure relates to an electronic device, and more specifically, to an electronic device having a display function.

Description of Related Art

Existing electronic devices, such as display devices, are prone to problems with insufficient brightness and contrast of the display screen under strong ambient light. In addition, in some application scenarios, the specular reflection light and scattered light of the display device may also reduce the visibility of the screen, resulting in difficulty for users to read data.

Therefore, it is desired to provide an improved electronic device to alleviate and/or obviate the above problems.

SUMMARY

The present disclosure provides an electronic device, which includes a display panel; an optical structure layer disposed on the display panel; a driving unit electrically connected to the display panel; a timing control unit electrically connected to the driving unit; and a light sensing unit electrically connected to the timing control unit for providing a light sensing result to the timing control unit. The timing control unit is used to receive a first signal, and provides a second signal and a third signal to the driving unit according to the light sensing result, and the driving unit drives the display panel according to the second signal and the third signal.

Other novel features of the disclosure will become more apparent from the following detailed description when taken in conjunction with the accompanying drawings.

DETAILED DESCRIPTION OF EMBODIMENT

Figure 1A:
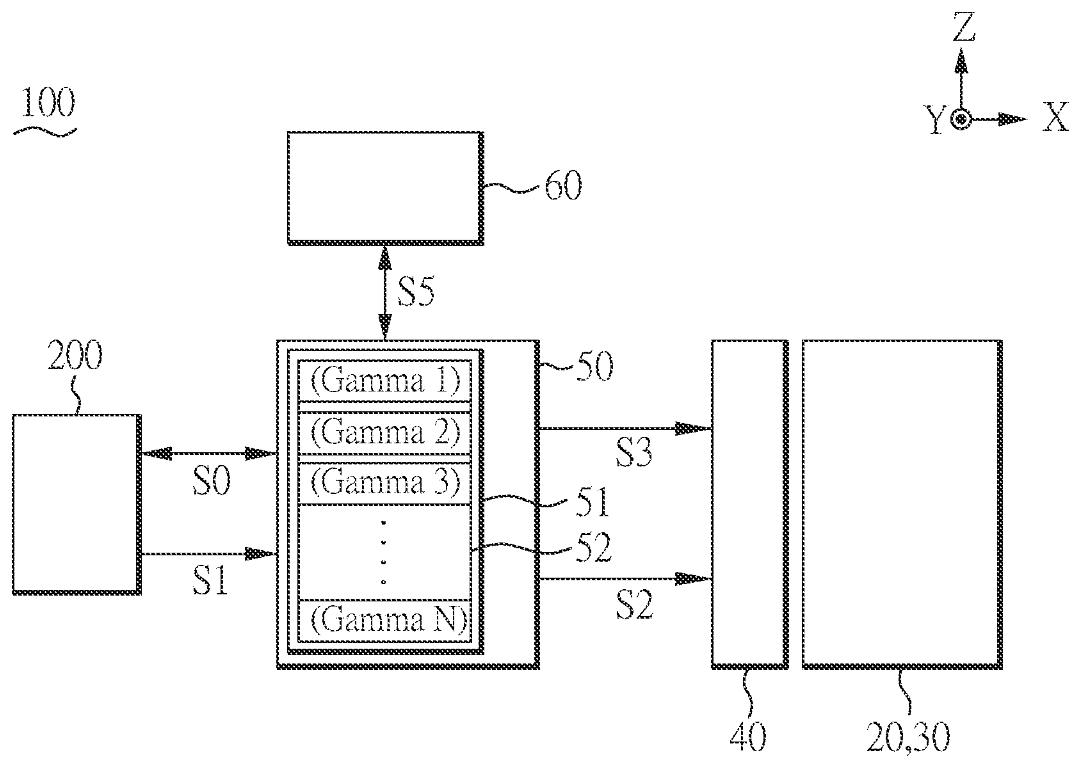
FIG. 1A shows a schematic diagram of an electronic device according to a first embodiment of the present disclosure.

The following provides different embodiments of the present disclosure. These embodiments are used to illustrate the technical content of the present disclosure, rather than to limit the claims of the present disclosure. A feature of one embodiment can be applied to other embodiments through suitable modification, substitution, combination, and separation.

It should be noted that in this specification, when a component is described as "comprising", "having", or "including" an element, it means that the component may include one or more elements, and the component may also include other elements, without implying that the component consists of only one of those elements, unless otherwise stated.

Moreover, in this specification, ordinal numbers such as "first" or "second" are only used to distinguish multiple elements with the same name, and do not mean that there is essentially a hierarchy, level, execution order, or manufacturing sequence, unless otherwise stated. The serial numbers of components in the specification may be different from those in the claim. For example, a "second" element in the specification may be a "first" element in the claim.

In the specification and claims, unless otherwise specified, the feature A "or" or "and/or" feature B means that feature A exists alone, feature B exists alone, or feature A and feature B exist at the same time. The feature A "and" feature B refers to the simultaneous existence of feature A and feature B.

In addition, in this specification, the terms "top", "upper", "bottom", "front", "back", or "middle", as well as the terms "above", "over", "on top", "under", "below" or "between" are used to describe the relative position between multiple elements, and the described relative position may be interpreted to include their translation, rotation or reflection.

In addition, the positions mentioned in the specification and claims, such as "over", "on", "above", "under" or "below" may mean that one element is in direct contact with other elements, or may mean that one element is in indirect contact with other elements.

In addition, terms described in the specification and claims, such as "connected", mean that one element not only can be directly connected to other elements, but also can be indirectly connected to other elements. On the other hand, terms such as "electrically connected" and "coupled" described in the specification and claims mean that one component not only can be directly electrically connected to other components, but also can be indirectly electrically connected to other components.

In this disclosure, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "range is a first value to a second value" and "range is between a first value and a second value" mean that the range includes the first value, the second value and other values between the first value and the second value.

Unless otherwise defined, all terms (including technical and scientific terms) used here have the same meanings as commonly understood by those skilled in the art of the present disclosure. It is understandable that these terms, such as those defined in commonly used dictionaries, should be interpreted as having a meaning consistent with the relevant technology and the background or context of the present disclosure, rather than in an idealized or excessively formal interpretation.

In the present disclosure, the electronic device may include a backlight device, a display device, an antenna device, a sensing device or a tiled device, but not limited thereto. The electronic device may be a bendable or flexible electronic device. The display device may be a non-self-luminous display device or a self-luminous display device. The antenna device may be a liquid crystal type antenna device or a non-liquid crystal type antenna device. The sensing device may be a sensing device that senses capacitance, light, heat energy or ultrasonic waves, but not limited thereto. The backlight device may include electronic components. The electronic components may include passive components and active components, such as capacitors, resistors, inductors, diodes, transistors, etc. The diodes may include light emitting diodes or photodiodes. The light emitting diode may include, for example, an organic light emitting diode (OLED), a mini light emitting diode (mini LED), a micro light emitting diode (micro LED) or a quantum dot light emitting diode (QD LED), but not limited thereto. The tiled device may be, for example, a display tiled device or an antenna tiled device, but not limited thereto. It should be noted that the electronic device may be any combination of the above, but not limited thereto. In the following description, the electronic device is exemplified by the display device.

Figure 1B:
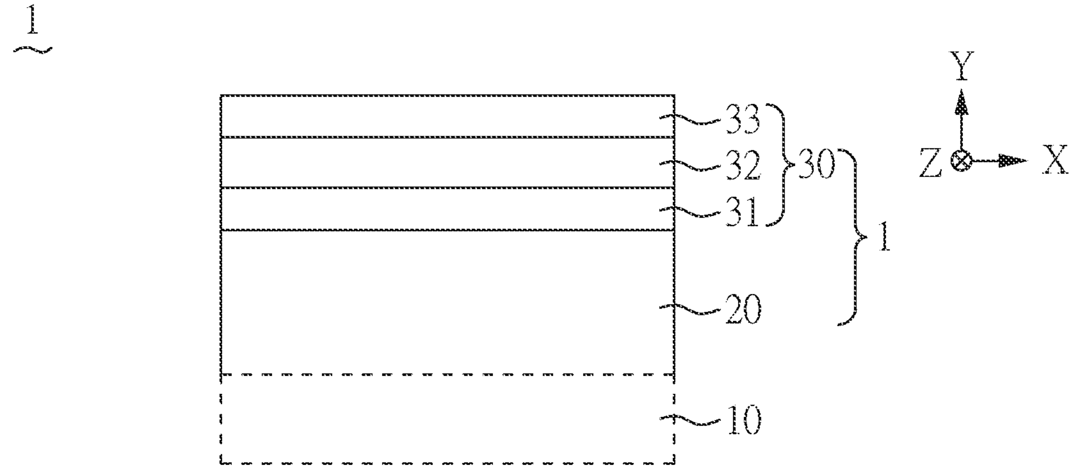
FIG. 1B shows a schematic diagram of a display module according to an embodiment of the present disclosure.

Please refer to FIG. 1A and FIG. 1B, wherein FIG. 1A shows a schematic diagram of an electronic device 100 according to a first embodiment of the present disclosure, and FIG. 1B shows a schematic diagram of a display module 1 according to an embodiment of the present disclosure.

As shown in FIG. 1A and FIG. 1B, the electronic device 100 may include a display panel 20, an optical structure layer 30, a driving unit 40, a timing control unit 50 and a light sensing unit 60, wherein the driving unit 40 may be electrically connected to the display panel 20, the timing control unit 50 may be electrically connected to the driving unit 40, and the light sensing unit 60 may be electrically connected to the timing control unit 50. In addition, the electronic device 100 may optionally include a backlight source 10. For example, when the display panel 20 is of a self-luminous type, the electronic device 100 may not be provided with the backlight source 10, and when the display panel 20 is of a non-self-luminous type, the electronic device 100 may be provided with the backlight source 10, while it is not limited thereto. In addition, in the Y direction (for example, the display direction of the electronic device 100), the display panel 20 may be disposed on the backlight source 10, and the optical structure layer 30 may be disposed on the display panel 20, wherein the display panel 20 and the optical structure layer 30 are each a portion of a display module 1, but it is not limited thereto.

Regarding the display panel 20, in one embodiment, when the display panel 20 is a self-luminous type, the display panel 20 may include a light emitting unit (not shown), where the type of the light emitting unit may include an organic light emitting diode (OLED), sub-millimeter light emitting diode (mini LED), micro light emitting diode (micro LED) or quantum dot light emitting diode (QD LED), while it is not limited thereto. When the display panel 20 is a non-self-luminous display panel, the display panel 20 may adopt, for example, a liquid crystal display, electrowetting display technology or electronic paper display technology, while it is not limited thereto. The detailed structure of the display panel 20 will be described in subsequent paragraphs.

Regarding the optical structure layer 30. In one embodiment, the optical structure layer 30 may include an anti-glare layer 32 and an anti-reflection layer 33, wherein the anti-glare layer 32 may be located between the anti-reflection layer 33 and the display panel 20. By adjusting the appropriate parameters of the anti-glare layer 32 and the anti-reflection layer 33, the specular reflection light and scattered light of the electronic device 100 may be significantly reduced. The detailed structure and parameter adjustment of the anti-glare layer 32 and the anti-reflection layer 33 will be described in subsequent paragraphs. In addition, in one embodiment, the optical structure layer 30 may also include a protective layer 31, and the protective layer 31 may be disposed between the display panel 20 and the anti-glare layer 32, but it is not limited thereto. In one embodiment, the protective layer 31 may be, for example, a glass cover or a protective film, but it is not limited thereto.

Regarding the driving unit 40, in one embodiment, the driving unit 40 may be, for example, a gate driver, a drain driver or other types of drivers of the display panel 20, or an integration of the above types of drivers, while it is not limited thereto. In one embodiment, the driving unit 40 may be implemented through a chip, while it is not limited thereto.

Regarding the timing control unit 50, in one embodiment, the timing control element 50 may be used to provide relevant control signals of the display panel 20 to the driving unit 40, such as but not limited to clock signals, image data or other types of control signals, and the driving unit 40 may be controlled according to the control signals to drive the display panel 20. In one embodiment, the timing control unit 50 may be, for example, a timing controller, which may be implemented through a chip, but it is not limited thereto. In addition, in one embodiment, the timing control unit 50 may include a memory unit 51, such as but not limited to a memory. The memory unit 51 may be used to store data, such as data entering the timing controller 50 or built-in data of the timing controller 50, while it is not limited thereto.

Furthermore, in one embodiment, the electronic device 100 may be electrically connected to a signal source end 200. The signal source end 200 may transmit an original control signal S0 and a first signal S1 to the timing control unit 50, wherein the first signal may include an original signal used for the image signal of the display panel 20, and the original control signal S0 may include the original signal of the clock signal for the display panel 20, the synchronization signal and/or other control signals. The timing control unit 50 may convert the first signal S1 and the original control signal S0 into a signal type that may be recognized by the driving unit 40, and transmit a second signal S2 and a third signal S3 to the driving unit 40, wherein the second signal S2 may include, for example, an image signal that may be recognized by the driving unit 40, and the third signal S3 may include, for example, a clock signal, a synchronization signal or other control signals that can be recognized by the driving unit 40, while it is not limited thereto.

In addition, in one embodiment, the signal transmission interface applicable to the first signal S1 may be, for example, but not limited to, MIPI (Mobile Industry Processor Interface), the signal transmission interface applicable to the original control signal S0 may be, for example, but not limited to, I2C (Inter-Integrated Circuit), the signal transmission interface applicable to the second signal S2 may be, for example, but not limited to MIPI or TTL (Transistor-Transistor Logic), and the signal transmission interface applicable to the third signal S3 may be of a type applicable to various driving units 40.

Regarding the light sensing unit, in one embodiment, the light sensing unit 60 may be, for example, an ambient light sensor, which may be used to sense the intensity of ambient light and output the light sensing result S5, while it is not limited thereto. The light sensing unit 60 may provide the light sensing result S5 to the timing control unit 50. In one embodiment, the signal transmission interface applicable to the light sensing result S5 may be, for example, but not limited to, I2C or SPI (Serial Peripheral Interface).

Next, the operation of the electronic device 100 of the first embodiment will be described. In one embodiment, the signal source end 200 provides the first signal S1 and the original control signal S0 to the timing control unit 50, and the light sensing unit 60 provides the light sensing result S5 to the timing control unit 50. Then, the timing control unit 50 provides the second signal S2 and the third signal S3 to the driving unit 40 according to the light sensing result S5. Then, the driving unit 40 drives the display panel 20 according to the second signal S2 and the third signal S3. There is a lookup table 52 stored in the memory unit 51 of the timing control unit 50. The lookup table 52 includes a plurality of gamma conversion data (for example, Gamma 1 to Gamma N, where N is a positive integer). The timing control unit 50 may select one of the gamma conversion data from the plurality of gamma conversion data in the lookup table 52 according to the light sensing result S5, and transmit the selected gamma conversion data and the clock signal, synchronization signal or other control signals that can be identified by the driving unit 40 to the driving unit 40 through the third signal S3. Therefore, the driving unit 40 may adjust the gamma curve of the display panel 20 according to the gamma conversion data in the third signal S3, so that the display effect of the display panel 20 may adapt to the ambient light intensity. The "display effect" here may include brightness, contrast, color saturation and/or color temperature, etc., while it is not limited thereto. It should be noted that, in this embodiment, the first signal S1 and the second signal S2 may be substantially the same. For example, the signal formats of the first signal S1 and the second signal S2 may be different, but the actual data content of the first signal S1 and the second signal S2 is the same. It should be noted that the so-called "actual data content is the same" means that the gray-scale value of each pixel in the image presented by the second signal S2 is the same as the gray-scale value of the corresponding pixel in the image presented by the first signal S1. That is, although the data codes of the first signal S1 and the second signal S2 may be different due to different signal formats, the color of the image presented by the signals remains unchanged.

As a result, with the electronic device 100 of the first embodiment, different gamma conversion data may be selected according to different ambient light intensities by using, for example, the lookup table 52, thereby adjusting the display effect of the display screen.

Figure 2:
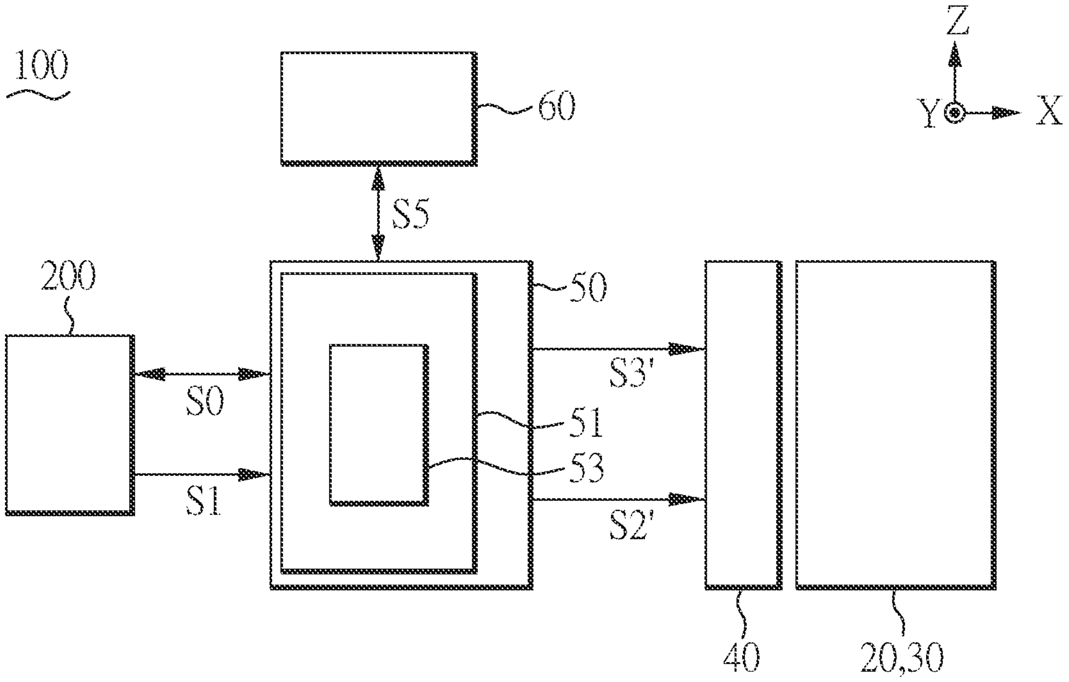
FIG. 2 shows a schematic diagram of an electronic device according to a second embodiment of the present disclosure.

FIG. 2 shows a schematic diagram of the electronic device 100 according to the second embodiment of the present disclosure, and please refer to FIG. 1A at the same time. Most of the features of the second embodiment may be applicable to the description of the first embodiment, and thus the following description mainly focuses on the differences.

As shown in FIG. 2, the memory unit 51 of the timing control unit 50 may be, for example, a non-transitory computer readable medium (such as but not limited to a memory), storing a computer program 53, wherein the computer program 53 has at least one instruction for causing the timing control unit 50 to execute an algorithm, such as selecting one gamma conversion data from a plurality of gamma conversion data according to the light sensing result S5, and converting the first signal S1 into the second signal S2' according to the gamma conversion data. In other words, the data content of the second signal S2' may be adjusted according to the gamma conversion data, so the first signal S1 and the second signal S2' may be substantially different. In addition, the third signal S3' of this embodiment may not include gamma conversion data. It should be noted that the so-called "substantially different" means that the gray-scale values of at least some pixels in the image presented by the second signal S2' are different from the gray-scale values of the corresponding pixels in the image presented by the first signal S1. That is to say, in the process of converting the data code of the first signal S1 into the data code of the second signal S2', the color of at least a portion of the image presented by the signal has been changed.

Therefore, when the electronic device 100 of this embodiment is in operation, the timing control unit 50 may adjust the data content of the first signal S1 based on the gamma conversion data through an algorithm to form the second signal S2', and the driving unit 40 may drive the display panel 20 according to the second signal S2', so that the display effect of the display panel 20 may be adapted to the ambient light intensity, while it is not limited thereto.

As a result, with the electronic device 100 of the second embodiment, the image signal may be adjusted according to the ambient light intensity by using, for example, an algorithm, thereby adjusting the display effect of the display screen.

Figure 3:
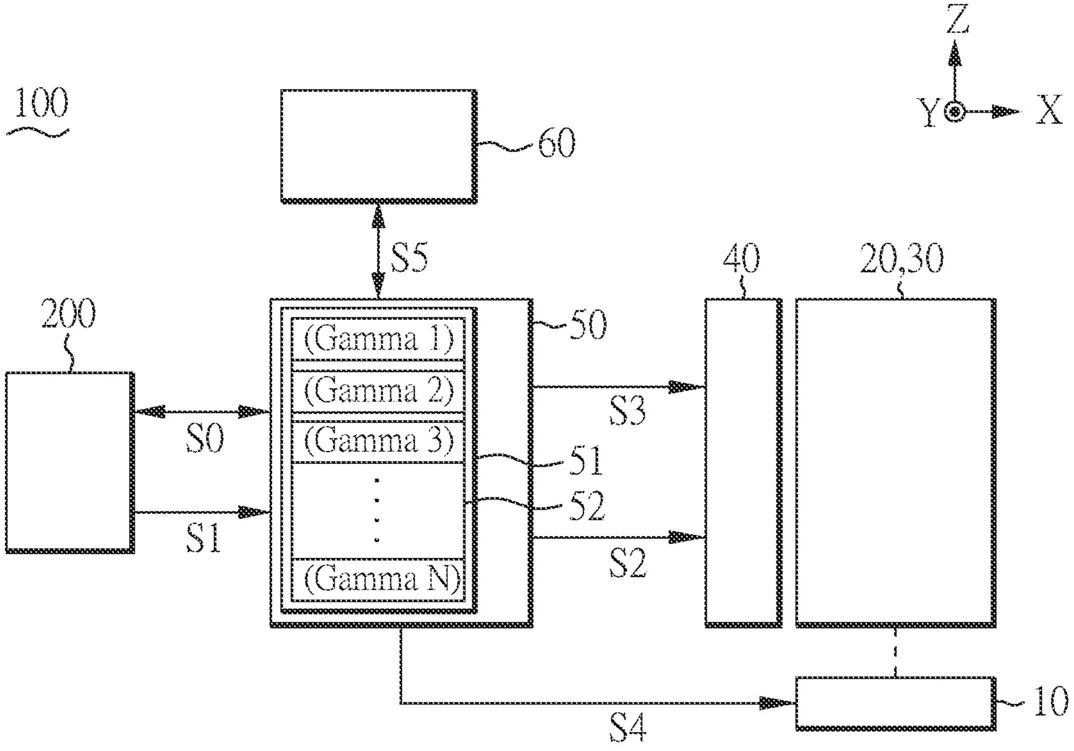
FIG. 3 shows a schematic diagram of an electronic device according to a third embodiment of the present disclosure.

FIG. 3 shows a schematic diagram of the electronic device 100 according to the third embodiment of the present disclosure, and please refer to FIG. 1A to FIG. 2 at the same time. Most of the features of the third embodiment may be applicable to the description of the first embodiment, and thus the following description mainly focuses on the differences.

As shown in FIG. 3, the memory unit 51 of the timing control unit 50 may store a plurality of gamma conversion data, so the timing control unit 50 may be adapted to the operation method of the first embodiment (using a lookup table to select gamma conversion data). In addition, the electronic device 100 of the third embodiment further includes a backlight source 10, and the backlight source 10 is electrically connected to the timing control unit 50. The timing control unit 50 may provide a fourth signal S4 to the backlight source 10 according to the light sensing result S5, and the backlight source 10 may adjust the backlight brightness according to the fourth signal S4. It should be noted that, in this embodiment, the fourth signal S4 may be independent of the gamma conversion data, that is, the brightness of the backlight source 10 may be not changed according to the gamma conversion data selected by the timing control unit 50.

As a result, with the electronic device 100 of the third embodiment, different gamma conversion data may be selected according to different ambient light intensities by using, for example, the lookup table 52, thereby adjusting the display effect of the display screen, and the backlight brightness of the backlight source 10 may be adjusted according to different ambient light intensities, thereby improving display quality.

Figure 4:
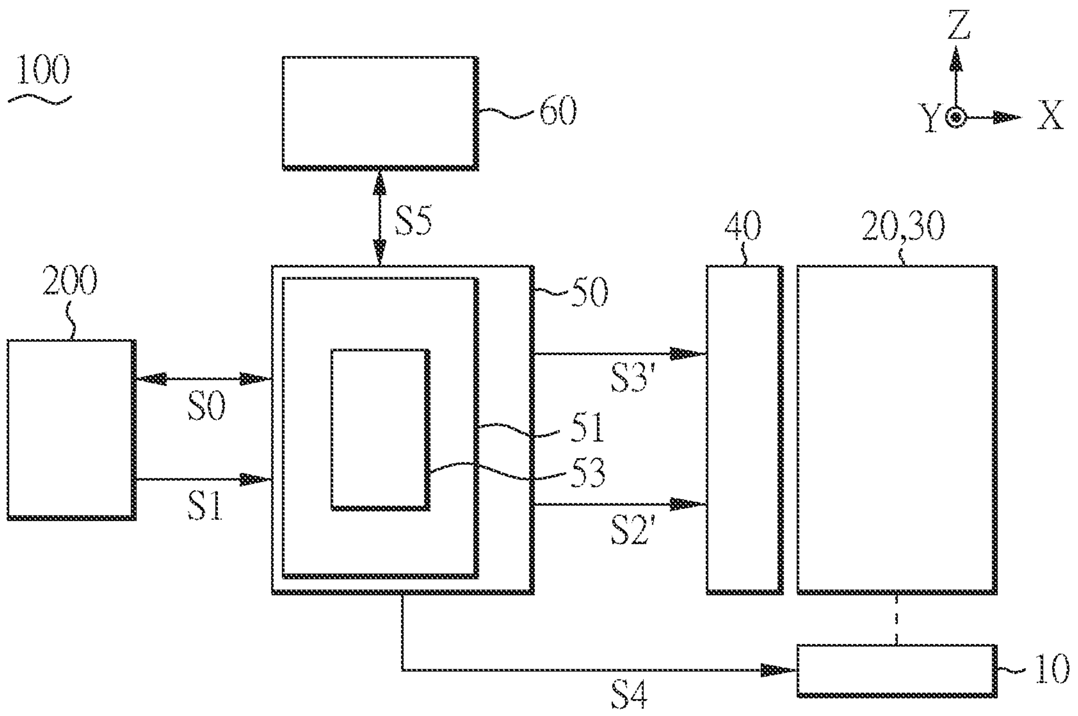
FIG. 4 shows a schematic diagram of an electronic device according to a fourth embodiment of the present disclosure.

FIG. 4 shows a schematic diagram of the electronic device 100 according to the fourth embodiment of the present disclosure, and please refer to FIG. 1A to FIG. 3 at the same time. Most of the features of the fourth embodiment may be applicable to the description of the second embodiment, and thus the following description mainly focuses on the differences.

As shown in FIG. 4, the memory unit 51 of the timing control unit 50 of the fourth embodiment may store a computer program 53, so that the timing control unit 50 may be adapted to the operation method of the second embodiment (using an algorithm to convert image signals). In addition, the electronic device 100 of the fourth embodiment further includes a backlight source 10, and the backlight source 10 is electrically connected to the timing control unit 50. The timing control unit 50 may provide the fourth signal S4 to the backlight source 10 according to the light sensing result S5, and the backlight source 10 may adjust the backlight brightness according to the fourth signal. It should be noted that the fourth signal S4 may have nothing to do with the result obtained after the computer program 53 executes the algorithm. That is, the brightness of the backlight source 10 may be not changed according to the result obtained after the computer program 53 executes the algorithm.

As a result, with the electronic device 100 of the fourth embodiment, the image signal may be adjusted according to the ambient light intensity by using, for example, an algorithm, thereby adjusting the display effect of the display screen, and the backlight brightness of the backlight source 10 may also be adjusted according to different ambient light intensities so as to improve display quality.

Figure 5:
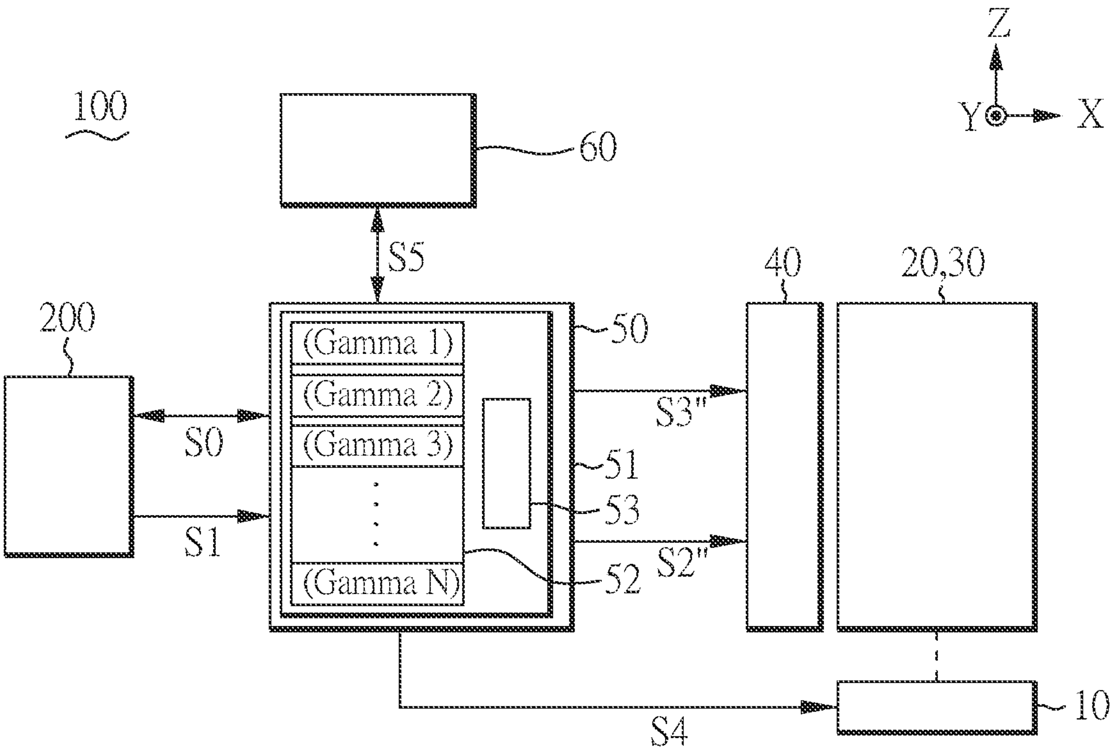
FIG. 5 shows a schematic diagram of an electronic device according to a fifth embodiment of the present disclosure.

FIG. 5 shows a schematic diagram of the electronic device 100 according to the fifth embodiment of the present disclosure, and please refer to FIG. 1A to FIG. 4 at the same time. Most of the features of the fifth embodiment may be applicable to the description of the third and fourth embodiments, and thus the following description mainly focuses on the differences.

As shown in FIG. 5, the memory unit 51 of the timing control unit 50 of the fifth embodiment may store a lookup table 52 and a computer program 53 at the same time. Therefore, based on the light sensing result S5, the timing control unit 50 may use the lookup table 52 to provide the third signal S3" including the gamma conversion data to the driving unit 40 and, at the same time, use an algorithm to convert the data content of the first signal S1 based on the gamma conversion data to form the second signal S2" and provide the second signal S2" to the driving unit 40. In addition, the electronic device 100 may be equipped with a backlight source 10, and the timing control unit 50 may provide a fourth signal S4 to the backlight source 10 according to the light sensing result S5 to adjust the backlight brightness of the backlight source 10.

As a result, with the electronic device 100 of the fifth embodiment, not only appropriate image signals may be provided through the lookup table 51 and the algorithm, but also the backlight brightness of the backlight source 10 may be adjusted according to different ambient light intensities, thereby improving the display quality.

Accordingly, the operation of the electronic device 100 of the present disclosure can be understood. Next, the detailed structure of the electronic device 100 will be described.

Figure 6A:
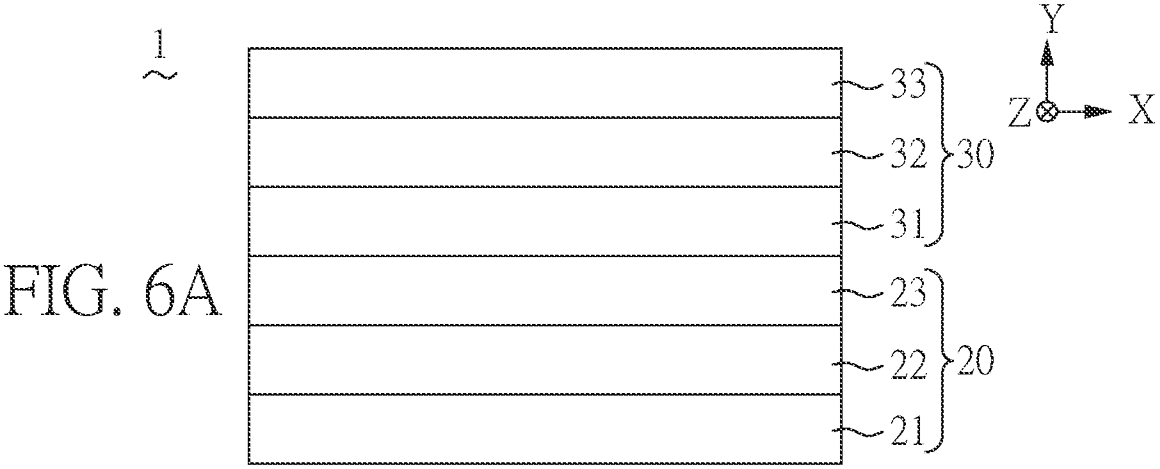
FIG. 6A shows a schematic structural diagram of a display module according to an embodiment of the present disclosure.

First, the detailed structure of the display module 1 (display panel 20 and optical structure layer 30) will be described. FIG. 6A shows a schematic structural diagram of the display module 1 according to an embodiment of the present disclosure, and please refer to FIG. 1A to FIG. 5 at the same time. The display module 1 of the embodiment of FIG. 6A may, for example, include a bottom layer 21, a light emitting layer 22, a dimming layer 23, a protective layer 31, an anti-glare layer 32 and an anti-reflection layer 33, wherein the combination of the bottom layer 21, the light emitting layer 22 and the dimming layer 23 may be regarded as the display panel 20, but the structure of the display panel 20 may not be limited thereto. In the Y direction, the light emitting layer 22 may be disposed on the bottom layer 21, the dimming layer 23 may be disposed on the light emitting layer 22, the protective layer 31 may be disposed on the dimming layer 23, the anti-glare layer 32 may be disposed on the protective layer 31, and the anti-reflection layer 33 may be disposed on the anti-glare layer 32, while it is not limited thereto.

Furthermore, the display module 1 in the embodiment of FIG. 6A may be, for example, an organic light emitting diode display module, but it is not limited thereto. In one embodiment, the bottom layer 21 may include, for example, a thin film transistor (TFT) array substrate, but it is not limited thereto. The thin film transistor array substrate may include a substrate, a plurality of thin film transistors and a plurality of wires disposed on the substrate. The substrate may include hard materials such as glass and quartz, or flexible materials such as polyimide (PI) and plastic. In this embodiment, the light emitting layer 22 may include a plurality of organic light emitting diodes. In one embodiment, the dimming layer 23 may include, for example, a polarizer or a color filter (CF), but it is not limited thereto. For example, in some embodiments, the dimming layer may include quantum dots (QDs).

Figure 6B:
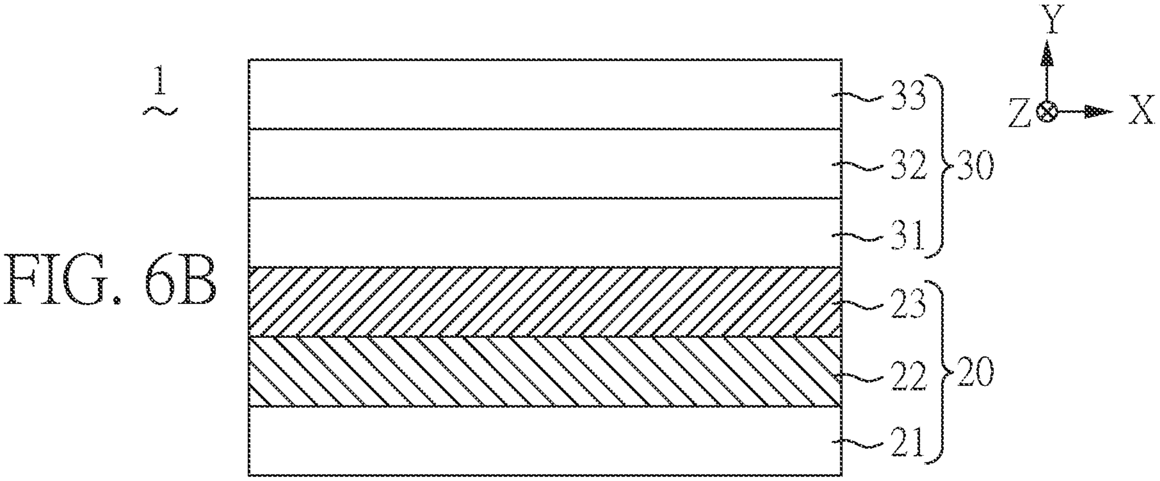
FIG. 6B shows a schematic structural diagram of a display module according to an embodiment of the present disclosure.

FIG. 6B shows a schematic structural diagram of the display module 1 according to an embodiment of the present disclosure, and please refer to FIG. 1A to FIG. 6A at the same time. The display module 1 of the embodiment of FIG. 6B may, for example, include a bottom layer 21, a light emitting layer 22, a dimming layer 23, a protective layer 31, an anti-glare layer 32 and an anti-reflection layer 33, wherein the combination of the bottom layer 21, the light emitting layer 22 and the dimming layer 23 may be regarded as the display panel 20, but the structure of the display panel 20 may not be limited thereto. In the Y direction, the light emitting layer 22 may be disposed on the bottom layer 21, the dimming layer 23 may be disposed on the light emitting layer 22, the protective layer 31 may be disposed on the dimming layer 23, the anti-glare layer 32 may be disposed on the protective layer 31, and the anti-reflection layer 33 may be disposed on the anti-glare layer 32, while it is not limited thereto.

Furthermore, the display module 1 of the embodiment of FIG. 6B may be, for example, a mini light emitting diode display module or a micro light emitting diode display module. In one embodiment, the bottom layer 21 and the dimming layer 23 in this embodiment may be the same as the bottom layer 21 and the dimming layer 23 in the embodiment shown in FIG. 6A, and thus will not be described again. In one embodiment, the light emitting layer 22 may include a plurality of mini light emitting diodes or micro light emitting diodes, while it is not limited thereto.

Figure 6C:
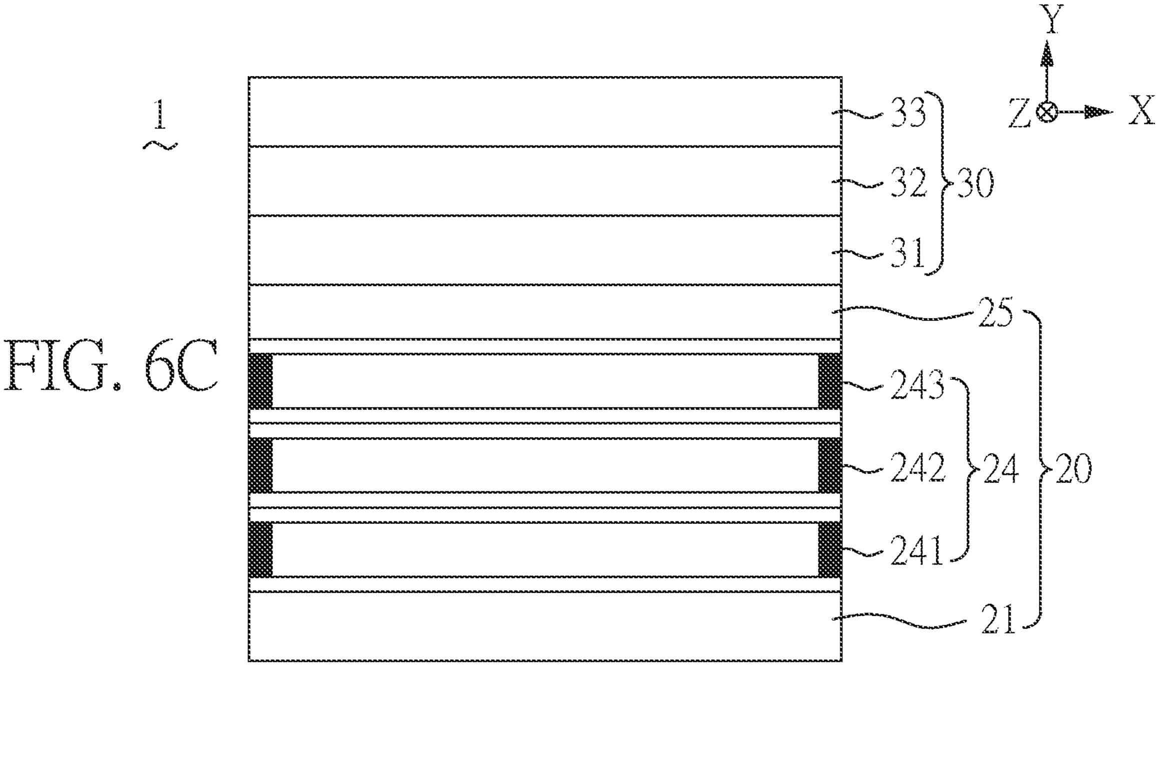
FIG. 6C shows a schematic structural diagram of a display module according to an embodiment of the present disclosure.

FIG. 6C shows a schematic structural diagram of the display module 1 according to an embodiment of the present disclosure, and please refer to FIG. 1A to FIG. 6B at the same time. The display module 1 in the embodiment of FIG. 6C may, for example, include a bottom layer 21, a cholesteric liquid crystal layer 24, a light guide unit 25, a protective layer 31, an anti-glare layer 32 and an anti-reflection layer 33, wherein the combination of the bottom layer 21, the cholesteric liquid crystal layer 24 and the light guide unit 25 may be regarded as the display panel 20, but the structure of the display panel 20 may not be limited thereto. In the Y direction, the cholesteric liquid crystal layer 24 may be disposed on the bottom layer 21, the light guide unit 25 may be disposed on the cholesteric liquid crystal layer 24, the protective layer 31 may be disposed on the light guide unit 25, the anti-glare layer 32 may be disposed on the protective layer 31, and the anti-reflection layer 33 may be disposed on the anti-glare layer 32, while it is not limited thereto.

Furthermore, the display module 1 in the embodiment of FIG. 6C may be, for example, a reflective liquid crystal display module. In one embodiment, the bottom layer 21 may, for example, include a light absorbing layer, but it is not limited thereto. In one embodiment, the cholesteric liquid crystal layer 24 may include, but not limited to, a first cholesteric liquid crystal sub-layer 241, a second cholesteric liquid crystal sub-layer 242, and a third cholesteric liquid crystal sub-layer 243, which respectively include liquid crystal cells corresponding to different emission wavelength ranges (for example, respectively corresponding to the wavelength range of red light, the wavelength range of blue light, and the wavelength range of green light). In one embodiment, the light guide unit 25 may include, for example, a light guide plate, a front light unit and/or an appropriate light adjustment unit, but it is not limited thereto.

Figure 6D:
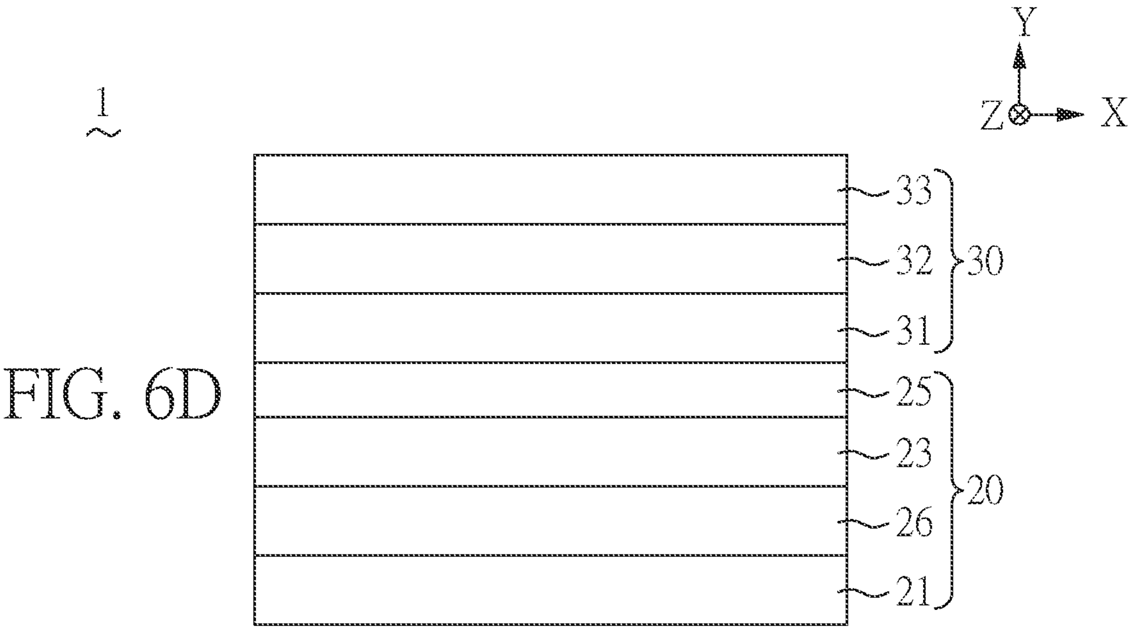
FIG. 6D shows a schematic structural diagram of a display module according to an embodiment of the present disclosure.

FIG. 6D shows a schematic structural diagram of the display module 1 according to an embodiment of the present disclosure, and please refer to FIG. 1A to FIG. 6C at the same time. The display module 1 of the embodiment in FIG. 6D may, for example, include a bottom layer 21, an electronic ink layer 26, a dimming layer 23, a light guide unit 25, a protective layer 31, an anti-glare layer 32 and an anti-reflection layer 33, wherein the combination of the bottom layer 21, the electronic ink layer 26, the dimming layer 23, and the light guide unit 25 may be regarded as the display panel 20, but the structure of the display panel 20 is not limited thereto. In the Y direction, the electronic ink layer 26 may be disposed on the bottom layer 21, the dimming layer 23 may be disposed on the electronic ink layer 26, the light guide unit 25 may be disposed on the dimming layer 23, the protective layer 31 may be disposed on the light guide unit 25, the anti-glare layer 32 may be disposed on the protective layer 31, and the anti-reflection layer 33 may be disposed on the anti-glare layer 32, while it is not limited thereto.

Furthermore, the display module 1 of the embodiment of FIG. 6D may be, for example, an electronic paper display module, but it is not limited thereto. In one embodiment, the bottom layer 21 may include, for example, a thin film transistor array substrate, but it is not limited thereto. In one embodiment, the dimming layer 23 may include, for example, a color filter, but it is not limited thereto. In one embodiment, the light guide unit 25 may include, for example, a light guide plate, a front light source, and/or an appropriate light adjustment unit, but it is not limited thereto.

It should be noted that the structures of the display module 1 of the embodiments of FIG. 6A to FIG. 6D may be applicable to the electronic device 100 of the first embodiment and the second embodiment (such as the embodiments of FIG. 1A and FIG. 2).

Figure 6E:
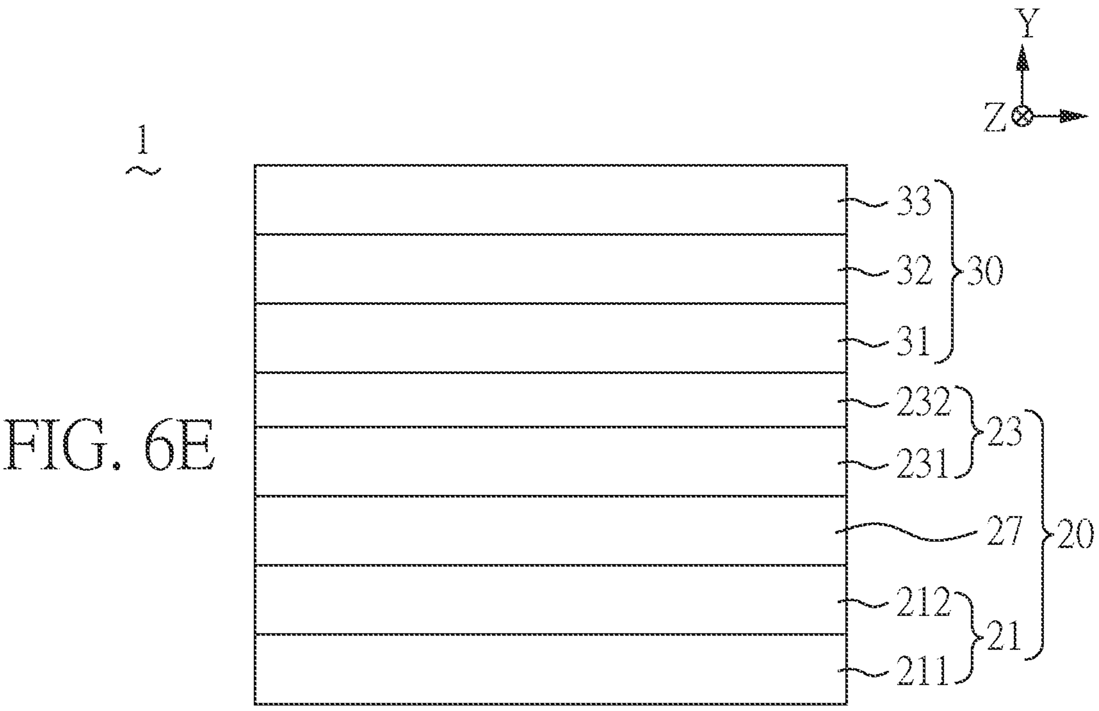
FIG. 6E shows a schematic structural diagram of a display module according to an embodiment of the present disclosure.

The structure of the display module 1 may also have other forms. FIG. 6E is a schematic structural diagram of the display module 1 according to an embodiment of the present disclosure, and please refer to FIG. 1A to FIG. 6D at the same time. The display module 1 of the embodiment in FIG. 6E may, for example, include a bottom layer 21, a display medium layer 27, a dimming layer 23, a protective layer 31, an anti-glare layer 32 and an anti-reflection layer 33, wherein the combination of the bottom layer 21, the display medium layer 27 and the dimming layer 23 may be regarded as a display panel 20. In the Y direction, the display medium layer 27 may be disposed on the bottom layer 21, the dimming layer 23 may be disposed on the display medium layer 27, the protective layer 31 may be disposed on the dimming layer 23, the anti-glare layer 32 may be disposed on the protective layer 31, and the anti-reflection layer 33 may be disposed on the anti-glare layer 32, while is not limited thereto.

Furthermore, the display module 1 of the embodiment of FIG. 6E may be, for example, a transmissive liquid crystal display module. In one embodiment, the bottom layer 21 may include, for example, a polarizer 211 and a thin film transistor array substrate 212, but it is not limited thereto. In one embodiment, the dimming layer 23 may include, for example, a color filter 231 and a polarizer 232, but it is not limited thereto.

It should be noted that the structures of the display module 1 of the embodiments of FIGS. 6E, 6C and 6D may be applicable to the electronic device 100 of the third to fifth embodiments (for example, the embodiments of FIGS. 3 to 5).

In addition, in one embodiment, the gloss of the display module 1 may be smaller than or equal to 10 GU (Gloss Unit), such as 5 GU. In one embodiment, the reflectivity of the specular component included (SCI) reflection light of the display module 1 may be smaller than or equal to 3% (0%<SCI reflectivity of the display module≤3%). In one embodiment, the reflectivity of the specular component excluded (SCE) reflection light of the display module 1 may be greater than or equal to 0.6 times its SCI reflectivity. As a result, the reflected light of the electronic device 100 may be reduced and the visual quality can be improved.

Accordingly, the structure of the display module 1 can be understood.

Next, the details of the optical structure layer 30 will be described. Please refer again to FIG. 6A to FIG. 6E.

In one embodiment, the gloss of the optical structure layer 30 may be between 4 GU and 35 GU (4 GU≤gloss of optical structure layer≤35 GU). In one embodiment, the gloss of the optical structure layer 30 may be between 4 GU and 30 GU (4 GU≤gloss of optical structure layer≤30 GU). In one embodiment, the gloss of the optical structure layer 30 may be between 4 GU and 20 GU (4 GU≤gloss of optical structure layer≤20 GU). However, the present disclosure is not limited thereto. In addition, in one embodiment, the transmittance of the optical structure layer 30 may be between 70% and 95% (70%≤transmittance of optical structure layer≤95%). In addition, in one embodiment, the reflectivity of the optical structure layer 30 may be smaller than or equal to 6% (0%≤reflectivity of optical structure layer≤6%). In one embodiment, the SCI reflectivity of optical structure layer may be between 3% and 6% (3%≤SCI reflectivity of optical structure layer≤6%). In one embodiment, the SCI reflectivity of the optical structure layer 30 may be between 4% and 6% (4%≤SCI reflectivity of optical structure layer≤6%). However, the present disclosure is not limited thereto.

In one embodiment, when the protective layer 31 is a glass cover, the anti-glare layer 32 and the protective layer 31 may form an anti-glare glass, wherein the gloss of the anti-glare glass may be between 10 GU and 50 GU (10 GU≤gloss of anti-glare glass≤50 GU), while it is not limited thereto. In one embodiment, the transmittance of the anti-glare glass may be greater than or equal to 90% (90%≤transmittance of anti-glare glass≤100%), while it is not limited thereto. In addition, in one embodiment, when the protective layer 31 is a protective film, the anti-glare layer 32 and the protective layer 31 may form an anti-glare protective film, wherein the gloss of the anti-glare protective film may be between 10 GU and 50 GU (10 GU≤gloss of anti-glare protective film≤50 GU), while it is not limited thereto. In one embodiment, the transmittance of the anti-glare protective film may be greater than or equal to 90 percent (90%≤transmittance of anti-glare glass≤100%), while it is not limited thereto.

Figure 7A:
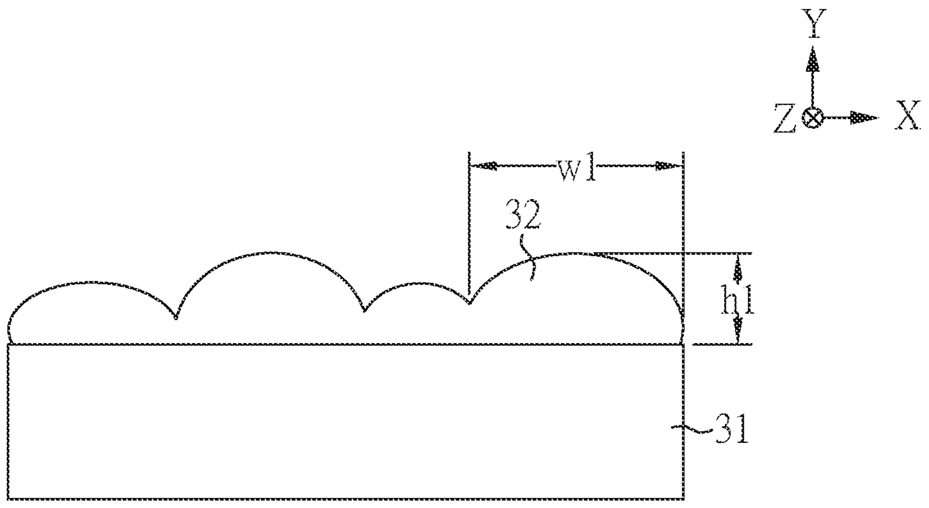
FIG. 7A shows a schematic structural diagram of an anti-glare layer according to an embodiment of the present disclosure.
Figure 7B:
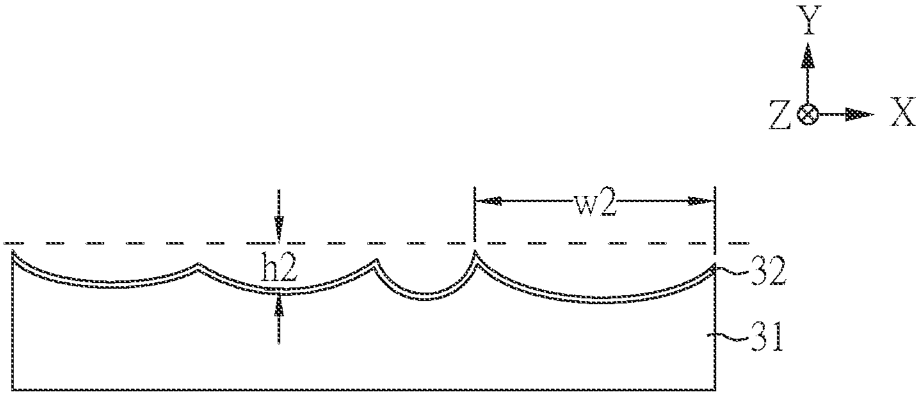
FIG. 7B shows a schematic structural diagram of an anti-glare layer according to an embodiment of the present disclosure.

Next, the details of the anti-glare layer 32 of the optical structure layer 30 will be described. FIG. 7A and FIG. 7B are respectively schematic structural diagrams of the anti-glare layer 32 according to an embodiment of the present disclosure, and please refer to FIG. 1A to FIG. 6E at the same time. FIG. 7A and FIG. 7B are used to illustrate the case where the protective layer 31 is a glass cover and the anti-glare layer 32 is formed on the glass cover.

As shown in FIG. 7A, in one embodiment, the anti-glare layer 32 may be disposed on the glass cover (protective layer 31) by spraying. In one embodiment, "spraying" is, for example, to apply a specific solution used to form the anti-glare layer 32 to a surface of the glass cover (protective layer 31), thereby generating multiple raised structures on the surface, and then use high temperature to solidify the specific solution and the glass cover (protective layer 31) thereby forming anti-glare glass having an anti-glare layer 32. In one embodiment, silicon dioxide ($SiO_2$) may be included in the specific solution, but it is not limited thereto. In one embodiment, the width w1 of each raised structure may be between 5 micrometers and 20 micrometers (5 μm≤w1≤20 μm), while it is not limited thereto. In one embodiment, the height h1 of each raised structure in the Y direction may be between 0.1 micrometers and 0.5 micrometers (0.1 μm≤h1≤0.5 μm), while it is not limited thereto. As a result, the anti-glare layer 32 may provide a good anti-glare effect. It should be noted that in the present disclosure, the depth h1 of a raised structure in the anti-glare layer 32 refers to the vertical distance from the highest point of the upper surface of the raised structure in a cross-sectional view to the upper surface of the protective layer 31 after the anti-glare layer 32 is provided. The width w1 is the horizontal distance between the lowest point on the left and the lowest point on the right of the raised structure.

As shown in FIG. 7B, in one embodiment, the glass cover (protective layer 31) may also be etched first, so that the protective layer 31 itself has multiple recessed structures, and then an anti-glare layer 32 is provided and formed on the protective layer 31. That is, in this embodiment, the effect of reducing glare comes from the combination of the protective layer 31 and the anti-glare layer 32. In this embodiment, "etching" is, for example, using an acidic substance to corrode the protective layer 31, thereby creating a recessed structure on the protective layer 31, and adding the anti-glare layer 32 to form anti-glare glass. In this embodiment, the combination of the protective layer 31 and the anti-glare layer 32 has a certain resistance to acidic substances or alkaline substances and may increase durability. In one embodiment, the width w2 of each recessed structure (for example, the distance between peaks or valleys of the recessed structure) may be between 5 micrometers and 20 micrometers (5 μm≤w2≤20 μm), while it is not limited thereto. In one embodiment, the depth h2 of each recessed structure in the Y direction may be between 0.1 micrometers and 0.5 micrometers (0.1 μm≤h2≤0.5 μm), while it is not limited thereto. As a result, the anti-glare layer 32 may provide a good anti-glare effect. It should be noted that, in the present disclosure, the depth h2 of a recessed structure refers to, after the anti-glare layer 32 is provided, the vertical distance from the highest point of the upper surface of the entire anti-glare layer 32 based on in a cross-sectional view to the lowest point of the upper surface of the anti-glare layer 32. The width w2 is the horizontal distance between the left vertex and the right vertex of the recessed structure in the cross-section view.

Figure 7C:
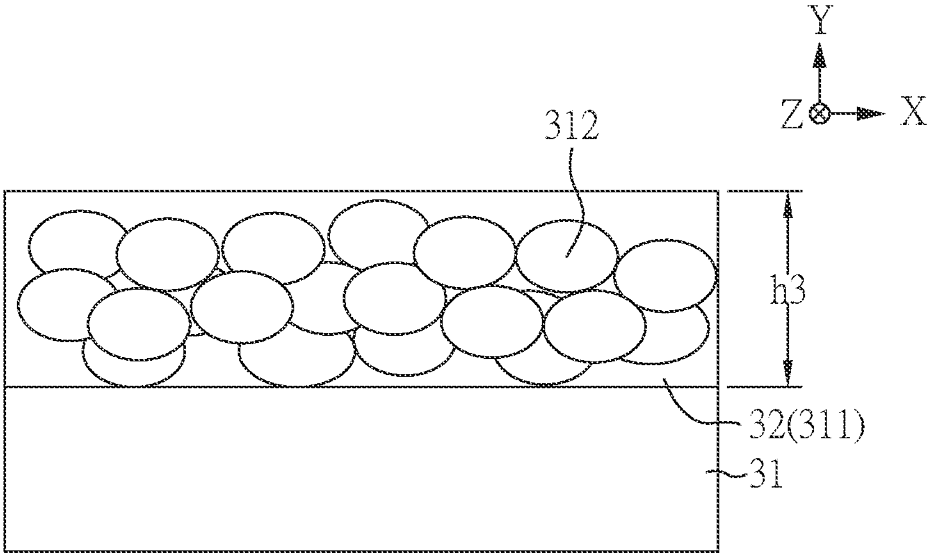
FIG. 7C shows a schematic structural diagram of an anti-glare layer according to an embodiment of the present disclosure.
Figure 7D:
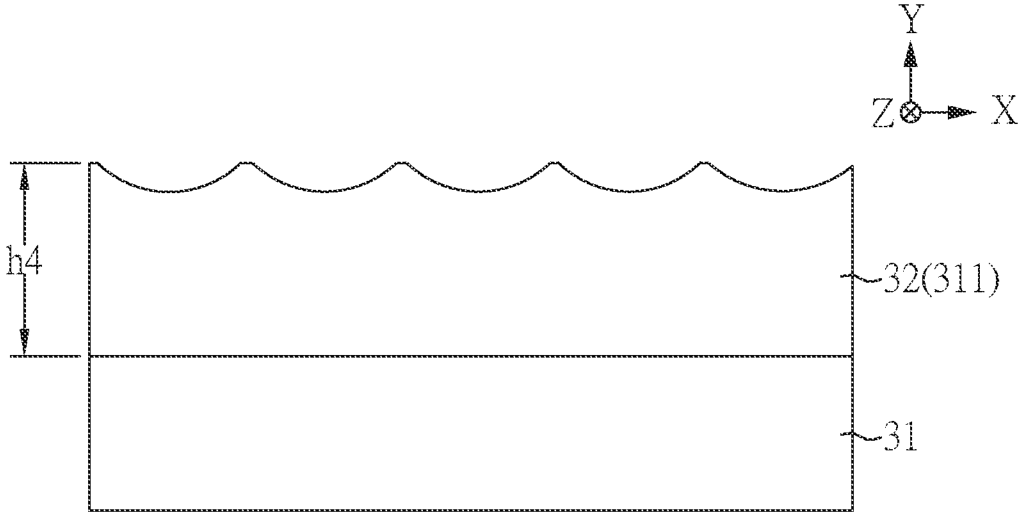
FIG. 7D shows a schematic structural diagram of an anti-glare layer according to an embodiment of the present disclosure.

FIG. 7C and FIG. 7D are respectively schematic structural diagrams of the anti-glare layer 32 according to an embodiment of the present disclosure, and please refer to FIG. 1A to FIG. 7B at the same time. FIG. 7C and FIG. 7D may be used to illustrate the situation when the protective layer 31 is a protective film and the anti-glare layer 32 is formed on the protective film.

As shown in FIG. 7C, in one embodiment, a coating 311 may be provided above the protective film (protective layer 31), and the anti-glare layer 32 may be formed by mixing specific particulate matter into the coating 311. In one embodiment, the coating 311 (anti-glare layer 32) may have a maximum thickness h3, and the maximum thickness h3 may be between 1 micrometer and 3 micrometers (1 μm≤h3≤3 μm), while it is not limited thereto.

As shown in FIG. 7D, in one embodiment, a coating 311 may be provided above the protective film (protective layer 31), and the anti-glare layer 32 may be formed by applying an imprinting technology on the coating 311 so as to generate recessed structures. In one embodiment, the coating 311 may have a maximum thickness h4 after generating the recessed structures. The maximum thickness h4 may be between 1 micrometer and 3 micrometers (1 μm≤h4≤3 μm), while the method of forming the recessed structures on the coating may not be limited to imprinting. For example, in some embodiments, an etching method similar to that shown in FIG. 7B may be used to generate recessed structures on the upper surface of the coating 311.

Figure 8:
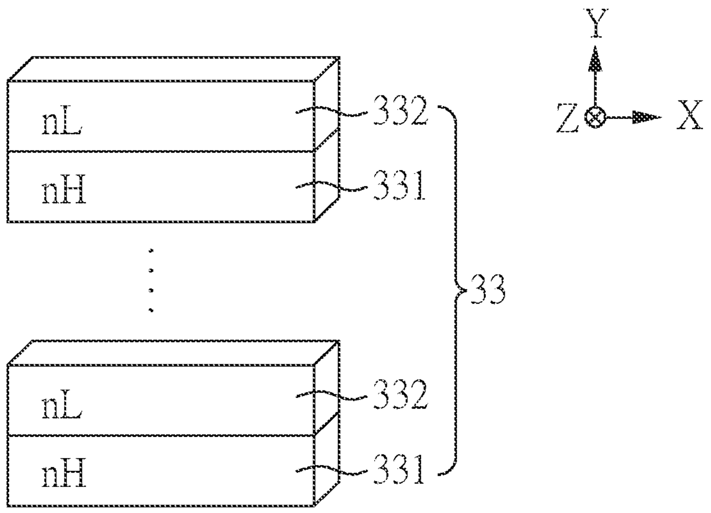
FIG. 8 shows a schematic structural diagram of an anti-reflection layer according to an embodiment of the present disclosure.

Next, the details of the anti-reflection layer 33 of the optical structure layer 30 will be described. FIG. 8 shows a schematic structural diagram of the anti-reflection layer 33 according to an embodiment of the present disclosure, and please refer to FIG. 1A to FIG. 7D at the same time.

As shown in FIG. 8, in one embodiment, the anti-reflection layer 33 may be formed by using, for example, physical vapor deposition coating technology, evaporation method, ion plating method, sputtering plating method or other suitable methods to provide multiple film layers with different refractive indexes on the surface of the anti-glare layer 32. In one embodiment, the anti-reflection layer 33 may include a plurality of high refractive index sub-layers 331 and a plurality of low refractive index sub-layers 332, wherein the high refractive index sub-layers 331 and the low refractive index sub-layers 332 may be stacked alternately. For example, at least a low refractive index sub-layer 332 is disposed between two high refractive index sub-layers 331, or a high refractive index sub-layer 331 is disposed between at least two low refractive index sub-layers 332, while it is not limited thereto. In one embodiment, the outermost sub-layer of the anti-reflection layer 33 in the display direction is the low refractive index sub-layer 332, while it is not limited thereto. In one embodiment, the total number of high refractive index sub-layers 331 and low refractive index sub-layers 332 is at least four layers, while it is not limited thereto.

In one embodiment, the material of the high refractive index sub-layer 331 of the anti-reflection layer 33 may include metal oxides, such as niobium pentoxide ($Nb_2O_5$), indium tin oxide (ITO), oxide titanium ($TiO_2$), zirconium oxide ($ZrO_2$), tantalum oxide ($Ta_2O_5$), other suitable oxides or a combination thereof, but it is not limited thereto. In one embodiment, the material of the low refractive index sub-layer 332 may include silicon dioxide ($SiO_2$), but it is not limited thereto. In one embodiment, the reflectivity of the anti-reflection layer 33 may be between 3 percent and 6 percent (3%≤reflectivity of anti-reflection layer≤6%), while it is not limited thereto. In one embodiment, the overall thickness of the anti-reflection layer 33 in the Y direction may be between 200 nanometers and 700 nanometers (200 nm≤overall thickness of anti-reflection layer≤700 nm), while it is not limited thereto. In one embodiment, the high refractive index sub-layer 331 of the smoke anti-reflection layer may have an absorption coefficient k, where the absorption coefficient k may be between 0.01 and 0.05, that is, 0.01≤k≤0.05, while it is not limited thereto. In addition, the low refractive index sub-layer 332 may have substantially no light absorption properties.

As a result, the structure of the optical structure layer 30 can be understood.

Figure 9:
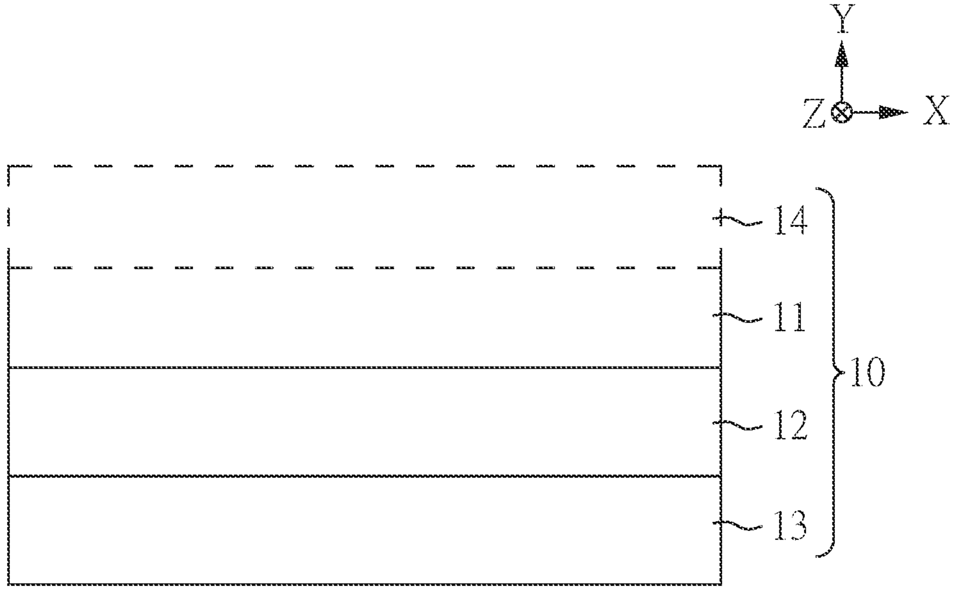
FIG. 9 shows a schematic structural diagram of a backlight source according to an embodiment of the present application.

Next, the details of the backlight source 10 will be described. FIG. 9 is a schematic structural diagram of the backlight source 10 according to an embodiment of the present disclosure, and please refer to FIG. 1A to FIG. 8 at the same time.

As shown in FIG. 9, the backlight source 10 may include a reflection layer 13, a light source layer 12, a first optical layer 11, and a backplane (not shown) that accommodates the reflection layer 13, the light source layer 12 and the first optical layer 11. In the Y direction, the light source layer 12 may be disposed on the reflection layer 13, and the first optical layer 11 may be disposed on the light source layer 12. That is, the first optical layer 11 may be closer to the display panel 20 than the light source layer 12 and the reflection layer 13, while it is not limited thereto. According to the structure, the backlight source 10 may be roughly divided into a side light backlight source and a direct light backlight source.

In one embodiment of a side light backlight source, the light source layer 12 may include a light guide plate and at least one light emitting unit (such as a light emitting diode), wherein the light emitting unit may be disposed on the side of the light guide plate. The optical pattern of the light guide plate may be used to adjust the light emitted from the light emitting unit into the light guide plate from the side into a direction perpendicular to the light guide plate for being emitted upward to the display panel 20. At this moment, the reflection layer 13 may reflect the light from the light emitting unit that enters the light guide plate from the side and then turns downward to be upward-directed light. The first optical layer 11 may include one or two light diffuser films to improve the overall brightness and uniformity of brightness distribution of the backlight source, while the components in the side light backlight source in the present disclosure may not be limited thereto.

In a direct light backlight source, the light source layer 12 may include at least one light emitting unit (such as a light emitting diode), and the first optical layer 11 may include at least one light diffusion plate, or a combination of a light diffusion plate and at least one light diffusion sheet, while it is not limited thereto. In one embodiment of the direct light backlight source, in the Y direction, a second optical layer 14 may be disposed above the first optical layer 11, wherein the second optical layer 14 may include at least one dual brightness enhancement film (DBEF), but it is not limited thereto.

Figure 10:
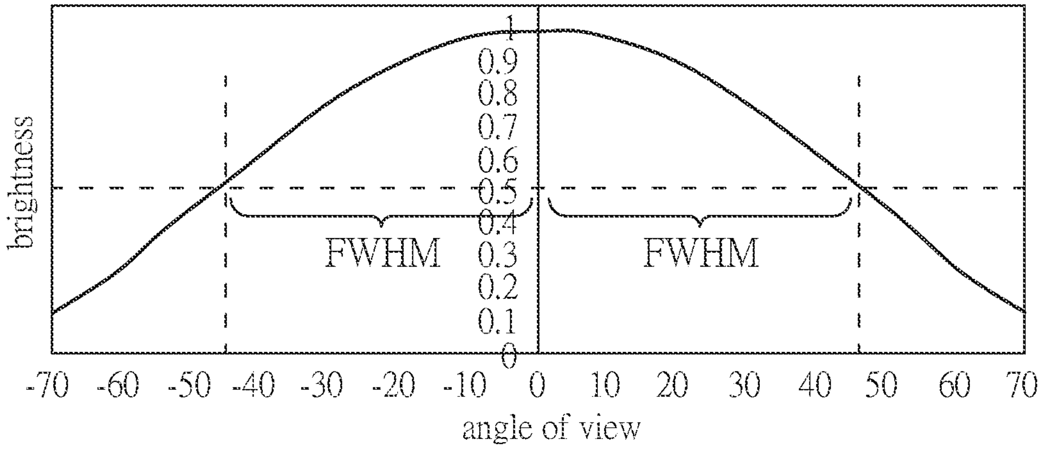
FIG. 10 shows a schematic diagram of the brightness versus angle-of-view distribution of a display module with a backlight source or the display module itself according to an embodiment of the present disclosure.

Next, FIG. 10 illustrates a schematic diagram of the viewing angle distribution of the display module 1 with the backlight source 10 (for example, the display module 1 is a non-self-luminous type) or the display module 1 itself (for example, the display module 1 is a self-luminous type), and please refer to FIG. 1 to FIG. 9 at the same time.

As shown in FIG. 10, the full width at half maximum (FWHM) of the brightness of the display module 1 with the backlight source 10 or the display module 1 itself corresponding to the angle of view may be greater than 40 degrees, that is, 40°≤FWHM, such as 45 degrees, while it is not limited thereto. The "full width at half maximum" here refers to the angle difference between the angle of view with half the brightness of the maximum brightness and the angle of view of zero degrees.

As a result, the backlight source 10 of the present disclosure can be understood.

From the above description, it can be seen that the electronic device of the present disclosure may automatically adjust the display effect according to the brightness of the ambient light so as to solve the problems of the prior art. Alternatively, the electronic device of the present disclosure has a special optical structure layer, which may reduce the reflected light from the display panel of the electronic device thereby improving the display quality.

In one embodiment, the present disclosure may determine whether a product in contention falls within the protection scope of the present disclosure at least by the presence or absence of components, component configurations and/or operating modes of the product, or by the algorithm of the product in contention to determine whether it falls within the protection scope of the present disclosure, while it is not limited thereto.

The features of the various embodiments of the present disclosure may be mixed and matched arbitrarily as long as they do not violate the spirit of the disclosure or conflict with each other.

The aforementioned specific embodiments should be construed as merely illustrative, and not limiting the rest of the present disclosure in any way.

The invention claimed is:

1. An electronic device, comprising:

a display panel;

an optical structure layer disposed on the display panel;

a driving unit electrically connected to the display panel;

a timing control unit electrically connected to the driving unit; and a light sensing unit electrically connected to the timing control unit for providing a light sensing result to the timing control unit, wherein the timing control unit is used to receive a first signal, and provides a second signal and a third signal to the driving unit according to the light sensing result, and the driving unit drives the display panel according to the second signal and the third signal, wherein the second signal includes an image signal regulated from the first signal by the timing control unit;

wherein the timing control unit selects one gamma conversion data from a plurality of gamma conversion data based on the light sensing result;

wherein the second signal is converted from the first signal based on the gamma conversion data;

wherein the first signal includes an image signal of the display panel, wherein gray-scale values of at least some pixels in an image presented by the second signal are different from gray-scale values of corresponding pixels in an image presented by the first signal;

wherein the third signal includes a clock signal or a synchronization signal.

2. The electronic device as claimed in claim 1, wherein the optical structure layer includes an anti-glare layer and an anti-reflection layer.

3. The electronic device as claimed in claim 2, wherein the anti-glare layer is disposed between the anti-reflection layer and the display panel.

4. The electronic device as claimed in claim 1, wherein the optical structure layer further includes a protective layer disposed between the display panel and the anti-glare layer.

5. The electronic device as claimed in claim 1, wherein a gloss of the optical structure layer is between 4 GU and 35 GU.

6. The electronic device as claimed in claim 1, further comprising a backlight source electrically connected to the timing control unit.

7. The electronic device as claimed in claim 6, wherein the timing control unit provides a fourth signal according to the light sensing result, and the backlight source adjusts backlight brightness according to the fourth signal.

8. The electronic device as claimed in claim 1, wherein the display panel includes a bottom layer, a light emitting layer disposed on the bottom layer, and a dimming layer disposed on the light emitting layer, in which the light emitting layer includes a plurality of organic light emitting diodes, wherein the dimming layer comprises a polarizer, a color filter or a quantum dots.

9. The electronic device as claimed in claim 1, wherein the display panel includes a bottom layer, a light emitting layer disposed on the bottom layer, and a dimming layer disposed on the light emitting layer, in which the light emitting layer includes a plurality of mini light emitting diodes or micro light emitting diodes, wherein the dimming layer comprises a polarizer, a color filter or a quantum dots.

10. The electronic device as claimed in claim 1, wherein the display panel includes a bottom layer, a cholesteric liquid crystal layer disposed on the bottom layer, and a light guide unit disposed on the cholesteric liquid crystal layer, in which the light emitting layer includes a plurality of mini light emitting diodes or micro light emitting diodes.

11. The electronic device as claimed in claim 10, wherein the bottom layer includes a light absorbing layer, and the cholesteric liquid crystal layer includes a first cholesteric liquid crystal sub-layer, a second cholesteric liquid crystal sub-layer and a third cholesteric liquid crystal sub-layer respectively including liquid crystal cells corresponding to different emission wavelength ranges.

12. The electronic device as claimed in claim 1, wherein the display panel includes a bottom layer, an electronic ink layer disposed on the bottom layer, a dimming layer disposed on the electronic ink layer, and a light guide unit disposed on the dimming layer, wherein the dimming layer comprises a polarizer, a color filter or a quantum dots.

13. The electronic device as claimed in claim 1, wherein the display panel includes a bottom layer, a display medium layer disposed on the bottom layer, and a dimming layer disposed on the display medium layer, wherein the dimming layer comprises a polarizer, a color filter or a quantum dots.

14. The electronic device as claimed in claim 13, wherein the bottom layer includes a polarizer and a thin film transistor array substrate.

15. The electronic device as claimed in claim 1, wherein a transmittance of the optical structure layer is between 70% and 95%.

16. The electronic device as claimed in claim 1, wherein a reflectivity of the optical structure layer is smaller than or equal to 6%.

17. The electronic device as claimed in claim 1, wherein a reflectivity of specular component included reflection light of the optical structure layer is between 3% and 6%.

* * * * *